United States Patent [19]
Simpson et al.

[11] Patent Number: 5,830,251
[45] Date of Patent: Nov. 3, 1998

[54] MANUFACTURE OF CERAMIC TILES FROM INDUSTRIAL WASTE

[75] Inventors: James C. Simpson, Perkiomenvill, Pa.; Maurizio Sanavia, Canonica D'Adda, Italy; James G. Hnat, Collegeville, Pa.

[73] Assignees: Vortec Corporation, Collegeville, Pa.; Welko Industrial S.P.A., Milano, Italy

[21] Appl. No.: 681,832

[22] Filed: Jul. 29, 1996

Related U.S. Application Data

[63] Continuation of Ser. No. 630,156, Apr. 10, 1996.

[51] Int. Cl.⁶ ............. C03B 19/01; C03B 19/09; C03B 5/16; C03B 19/06
[52] U.S. Cl. ............. 65/17.3; 65/331; 65/134.8; 65/144; 501/5; 501/155
[58] Field of Search ............. 65/17.3, 33.1, 65/66, 134.8, 144; 501/5, 155; 264/62, 64, 66

[56] References Cited

U.S. PATENT DOCUMENTS

| | | |
|---|---|---|
| 3,840,394 | 10/1974 | Eppler . |
| 3,929,497 | 12/1975 | Clark-Monks ............. 106/50 |
| 3,942,966 | 3/1976 | Kroyer et al. . |
| 3,967,971 | 7/1976 | Eppler . |
| 4,009,015 | 2/1977 | McCollister ............. 65/33 |
| 4,112,033 | 9/1978 | Lingl . |
| 4,252,551 | 2/1981 | Nishimura ............. 65/28 |
| 4,621,066 | 11/1986 | Nishigaki et al. . |
| 4,640,899 | 2/1987 | Hillig et al. ............. 501/5 |
| 4,755,489 | 7/1988 | Chyung et al. . |
| 4,853,350 | 8/1989 | Chen et al. . |
| 4,892,846 | 1/1990 | Rogers et al. . |
| 4,957,527 | 9/1990 | Hnat . |
| 4,985,375 | 1/1991 | Tanaka et al. ............. 501/5 |
| 5,008,053 | 4/1991 | Hashimoto et al. ............. 264/60 |
| 5,175,134 | 12/1992 | Kaneko et al. . |
| 5,190,895 | 3/1993 | Uchida et al. . |
| 5,210,057 | 5/1993 | Haun et al. . |
| 5,250,474 | 10/1993 | Siebers ............. 501/9 |
| 5,312,787 | 5/1994 | Uchida et al. . |
| 5,350,716 | 9/1994 | Beall et al. . |
| 5,356,841 | 10/1994 | Mizutani et al. . |
| 5,369,062 | 11/1994 | Chiang et al. . |
| 5,434,333 | 7/1995 | Jantzen et al. ............. 588/3 |
| 5,558,690 | 9/1996 | Hnat et al. ............. 65/134.8 |
| 5,571,301 | 11/1996 | Yamaura et al. ............. 65/335 |

FOREIGN PATENT DOCUMENTS

| | | |
|---|---|---|
| 1557957 | 1/1969 | France . |
| 986289 | 3/1965 | United Kingdom . |
| 1163873 | 9/1969 | United Kingdom . |
| 1167812 | 10/1969 | United Kingdom . |
| 1195931 | 6/1970 | United Kingdom . |

*Primary Examiner*—Donald E. Czaja
*Assistant Examiner*—Jacquline A. Ruller
*Attorney, Agent, or Firm*—Nixon, Hargrave, Devans & Doyle LLP

[57] ABSTRACT

The present invention relates to a process of forming ceramic tiles having the appearance of tiles produced from clays. The process includes melting a material to form a glass melt, treating the glass melt to produce a solid glass product, grinding the solid glass product to produce glass particles having a particle size of less than 200 microns, mixing the glass particles with a first additive to form a glass powder mixture having a composition of 55 to 99 wt. % glass particles and 45–1 wt. % first additive, forming the glass powder mixture into tiles by dry pressing, where the tiles have a primary crystalline phase selected from the group consisting of nepheline, diopside, anorthite, wollastonite, melilite, merwinite, spinel, akermanite, gehlenite, crystalline phases based on iron substitutions in the crystalline phase, and mixtures thereof. The process includes a devitrifying step where the solid glass product is devitrified prior to the grinding step or the glass particles in the tile are devitrified after the forming step.

35 Claims, 4 Drawing Sheets

MANUFACTURE OF CERAMIC TILES FROM INDUSTRIAL WASTE

This application is a continuation of U.S. patent application Ser. No. 08/630,156 filed Apr. 10, 1996.

FIELD OF THE INVENTION

This invention relates to the manufacture of ceramic tiles that include a high percentage of recycled glass incorporated into the tile.

BACKGROUND OF INVENTION

Industrial wastes such as boiler fly ash, auto shredder residue ash, sewage sludge ash, municipal solid waste incinerator ash, spent potliners from aluminum reduction, and electric arc furnace dust account for a major portion of all solid wastes being landfilled in the U.S., and are therefore becoming a major environmental issue. These solid wastes may contain heavy metal contaminants which require proper disposal methods to prevent leaching of the heavy metal contaminants into water supplies. This has focused attention on reducing landfilling and on regulations that prevent leachable toxic materials from being disposed of in landfills. Substantial efforts have, therefore, been made to develop uses for these solid waste materials as safe recycled products.

The traditional method of tile manufacturing involves the mixing of clays and other minerals into a powder batch which can be shaped by dry pressing into a tile, dried, glazed, and fired to yield a final product. Typically, the clays, minerals, and other additives are mixed in a ball mill with water. Ball milling provides a method for reducing the particle size and intimately blending the raw materials. The ball milling process results in a slurry of the raw materials in water. The slurry from the ball mill is spray dried to remove the water and to produce a granular material which provides a feedstock to the tile presses. The granular material from the spray drier consists of agglomerates of raw material particles. The agglomerates typically form a free flowing powder that is easy to transport, which does not cake, and evenly fills the dies used for pressing the tiles. The tiles are pressed into shape using a hydraulic press. The pressed tiles are dried to remove water that may be present after pressing. The dried tiles are then glazed to provide a smooth, durable, and aesthetically pleasing finish. The tiles are then typically fired in a tunnel kiln. During the firing process, the clays and other compounds react to fuse into a solid ceramic material.

Present firing technology allows for the firing cycle in traditional tile production to be less than 1 hour. The shortest firing times of traditional clay bodies are limited by the organic material present in the clay. A high carbon composition in the clay can lead to "black core" in the final tile product. Black core occurs when the center of the tile body obtains a dark color due to the reducing effects of incompletely oxidized carbon. This effect is undesirable in the production of tiles.

The raw materials combined to produce a tile body perform different roles in achieving the properties of the final product. Fluxes soften and form a liquid which dissolves and bonds the particles together. Fluxes used in the tile industry included feldspars and glass frits. Plasticizers and binders bond the tile together before the tile is fired. Plasticizers and binders include clays with fine particle sizes such as ball clays and organic binders. Body fillers provide the structure of the tile body. Typically, these materials do not deform significantly during the firing process. Body fillers include quartz, flint, anorthite, raw clays (kaolin), and molochite "grog."

One method of using recycled glass involves incorporating container glass cullet into ceramic tile bodies. Container glass cullet has a soda-lime-silicate composition (approximately 14 wt. % $Na_2O$, 10 wt. % CaO, and 76 wt. % $SiO_2$). The glass cullet is ground into a fine powder, mixed with other materials such as clay, silica, or talc, pressed into a tile shape, glazed, and fired to give a final product. During the firing process, the glass melts and forms a viscous liquid that dissolves the other batch materials and leads to a high rate of densification of the tile body. Thus, due to the low softening temperature of the container glass cullet (approximately 700° C.), the use of the container glass cullet is limited to the role of a flux in the tile body. Accordingly, this method is unsatisfactory, because the addition of the recycled glass to the batch is limited to less than 40 wt. %.

British Patent Nos. 1,163,873, 1,167,812, 1,195,931, and French Patent No. 1,557,957 to Bondarev et al. disclose a process for vitrifying various industrial waste materials into a glass, forming the molten glass into sheets, and then heat treating the glass to form a devitrified product.

U.S. Pat. No. 5,250,474 to Siebers discloses a method for producing hexagonal cordierite from sintered glasses. The method includes melting a glass powder, quenching the melt to form a cullet, grinding the cullet, pressing the particles into a shaped article, and sintering to form a devitrified product.

U.S. Pat. No. 3,942,966 to Kroyer et al. relates to a method of preparing a ceramic material comprising particles of a devitrified glass and a silicate binder. The method includes forming a mixture of crystallizable glass frit particles and a silicate binder and, optionally, waste glass. The mixture is heated to melt and devitrify the glass, followed by cooling the mixture, forming a plate, and firing the plate to produce building elements, such as bricks. The crystallizable glass frit utilized in the mixture is prepared by melting starting materials, preferably having the following composition: greater than 60% by weight $SiO_2$; greater than 20% by weight CaO+MgO; less than 5% by weight $Al_2O_3$; less than 5% by weight $K_2O+Na_2O$; below 1% by weight $Fe_2O_3$; and less than 1% by weight S. The melt is then quenched and crushed to less than 2 mm.

British Patent No. 986,289 relates to a material produced by the devitrification of a glass made from a metallurgical slag. The material, which may be a floor tile, is produced by the steps of preparing a melt consisting essentially of 45 to 65 weight % $SiO_2$, 15 to 45 wt. % CaO, 5 to 30 wt. % $Al_2O$, and up to 10% MgO, and heat treating the melt to cause devitrification. A nucleating agent can be added to the melt to cause devitrification of the composition during this heat treatment. The heat treatment is comprised of either heating or cooling the melt to cause devitrification.

Although these procedures have been found to be useful in converting waste products to a form useful as an end product, they do not sufficiently oxidize the organic material and the metallic contaminants in the waste material to produce a ceramic product of uniform quality. In addition, these procedures are not suitable for using high percentages of recycled waste as a raw material in the process. Further, none of these procedures produce a high-value end product with significant market demand. As a result, economic justification for the capital and operational costs of implementing such procedures for disposal of industrial waste tend to be problematic. The present invention is directed to overcoming these deficiencies.

SUMMARY OF THE INVENTION

The present invention relates to a process of forming ceramic tiles having the appearance of tiles produced from clays. The process includes melting a material to form a glass melt, treating the glass melt to produce a solid glass product, grinding the solid glass product to produce glass particles having a particle size of less than 200 microns, mixing the glass particles with a first additive to form a glass powder mixture having a composition of 55 to 99 wt. % glass particles and 45–1 wt. % first additive, forming the glass powder mixture into tiles by dry pressing, where the tiles have a primary crystalline phase selected from the group consisting of nepheline, diopside, anorthite, wollastonite, melilite, merwinite, spinel, akermanite, gehlenite, crystalline phases based on iron substitutions in the crystalline phase, and mixtures thereof. The process includes a devitrifying step where the solid glass product is devitrified prior to the grinding step or the glass particles in the tile are devitrified after the forming step.

Another aspect of the invention is a ceramic tile having a composition of 35–60 wt. % $SiO_2$, 3–25 wt. % $Al_2O_3$, 0–25 wt. % CaO, 0–20 wt. % MgO, 0.5–15 wt. % $Fe_2O_3$, 0–15 wt. % $Na_2O$, 0 to 5 wt. % $K_2O$, 15 to 30 wt. % CaO+MgO, 0 to 15 wt. % $Na_2O+K_2O$, and 0–5 wt. % other oxides.

The method of the present invention provides for the use of waste or recycled glass as a material to be incorporated with other materials to produce a high quality, low cost, high-value end product. Further, the very low carbon content in the recycled glass allows for high firing rates to be used with the tile bodies without the occurrence of "black core" which is commonly encountered with ceramic bodies made from standard raw materials. In addition, the method of the present invention allows for the use of high percentages of recycled glass as a feed material.

DETAILED DESCRIPTION OF THE INVENTION

Figure 1:
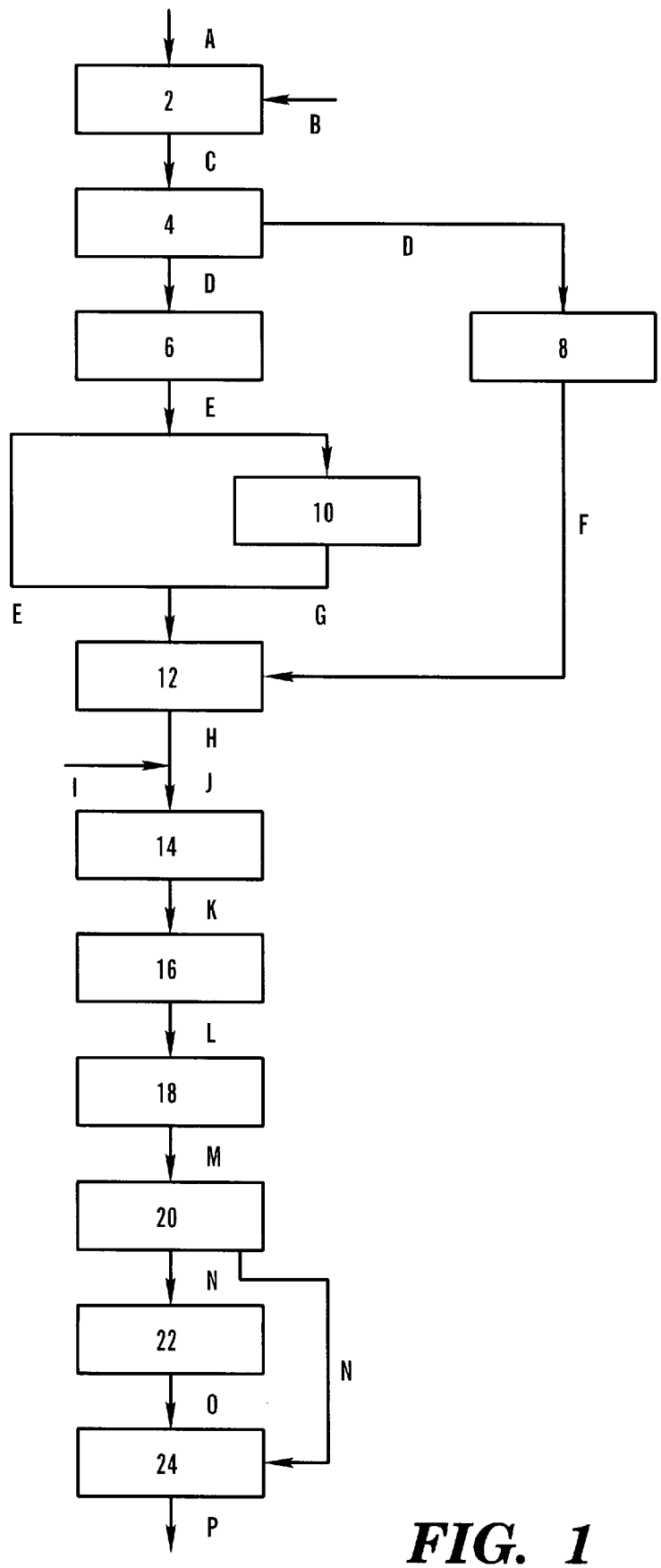
FIG. 1 is a schematic flow diagram of the process of the present invention.

The present invention relates to a process of forming ceramic tiles having the appearance of tiles produced from clays. The process includes melting a material to form a glass melt, treating the glass melt to produce a solid glass product, grinding the solid glass product to produce glass particles having a particle size of less than 200 microns, mixing the glass particles with a first additive to form a glass powder mixture having a composition of 55 to 99 wt. % glass particles and 45–1 wt. % first additive, forming the glass powder mixture into tiles by dry pressing, where the tiles have a primary crystalline phase selected from the group consisting of nepheline, diopside, anorthite, wollastonite, melilite, merwinite, spinel, akermanite, gehlenite, crystalline phases based on iron substitutions in the crystalline phase, and mixtures thereof. The process includes a devitrifying step where the solid glass product is devitrified prior to the grinding step or the glass particles in the tile are devitrified after the forming step.

Typically, the chemical composition of the raw materials used to produce tiles by prior art processes primarily consist of oxides and hydroxides of the metals, Si, Al, Ca, and Mg, which react during the firing process to yield the final ceramic body. To reduce the waste industrial materials generated by society that have high concentrations of these oxides, it is highly desirable to replace these traditional raw materials with industrial waste. The waste materials, however, need to be selected to adequately fill the required roles of the raw material being substituted.

The method of the present invention allows for the use of recycled glass compositions that can comprise the majority of a tile's composition. The method for incorporating these high amounts of recycled glass as a feed material involves engineering a recyled glass composition from the industrial waste. By selecting the optimum composition of the recycled glass, the recycled glass no longer fills the roll of a flux in the tile body, but is selected to act as a tile body filler. The composition of the recycled glass is critical, because glasses are thermodynamically unstable with respect to the crystalline forms of the oxides below the melting temperature of the crystalline phase. By heating a glass according to a specific heat treatment cycle, the oxides that compose the glass can be converted to crystalline phases. Materials produced in this manner are referred to as glass ceramics. The crystallization rate and the crystalline phases obtained are dependent of the glass composition and the heat treatment cycle. The physical properties of the glass material change with the transition from a glass to a crystal. As an example, the melting temperature of the crystalline phases is greater than the softening temperature of the glass.

The method of the present invention allows for devitrification of the glass at one of two points in the process. The glass is devitrified either before or after the glass (and other materials) are formed into the tile and fired. By devitrifying the glass before forming into the tile body, the softening/melting temperature of the material is increased to above the firing temperature of the ceramic body. Alternatively, if the glass is mixed with other materials and formed into the tile body without prior devitrification, during the firing process, the small particles of glass will soften slightly and devitrify to form a crystalline material. The melting temperature of the devitrified glass in both cases is such that the tile body does not deform during the firing process. Further, in addition to producing a product that is suitable for use as a body filler in tile manufacturing, the inital vitrification process during oxidation stabilizes the hazardous metals and destroys the organics that may be present in these waste streams.

The selected glasses can be prepared from industrial wastes and/or commercially mined raw materials. The general composition range of the industrial waste useful in the present invention is given in Table 1:

TABLE 1

| Oxide | Weight % |
| --- | --- |
| $SiO_2$ | 35 to 60 |
| $Al_2O_3$ | 3 to 25 |
| CaO | 0 to 25 |

TABLE 1-continued

| Oxide | Weight % |
| --- | --- |
| MgO | 0 to 20 |
| CaO + MgO | 15 to 30 |
| $Na_2O$ | 0 to 15 |
| $K_2O$ | 0 to 5 |
| $Na_2O + K_2O$ | 0 to 15 |
| $Fe_2O_3$ | 0.5 to 15 |
| Other Oxides | 0 to 5 wt % |

Other oxides include copper, manganese, chromium, nickel, zinc, arsenic, lead, gold, silver, sulfur, and mixtures thereof. Further, the industrial waste can include carbon and metallic contaminants.

A variety of industrial wastes are suitable for producing a recyled glass composition which comprises the majority of the material in a traditional dry pressing tile process. Using these industrial wastes, ceramic tile bodies can be obtained with up to 98 weight percent recycled glass in the tile body. Types of industrial waste useful as a feed material for the present invention include, for example, coal fired utility boiler flyash, municipal waste incinerator ash, spent pot liners from aluminum reduction, metal plating waste, electric arc furnace dust, foundry sands, sewage sludge ashes, and cement kiln dusts. Composition of typical spent potlining is given in Table 2.

TABLE 2

Composition of Typical Spent Potlining

| Constituent | Concentration Range (ppm) |
| --- | --- |
| Arsenic | .001–26 |
| Barium | <.09–200 |
| Cadmium | .01–4.9 |
| Chromium | <.01–33 |
| Lead | <.01–44 |
| Mercury | <.0002–.49 |
| Selenium | .004–.96 |
| Silver | .01–2 |
| Cyanides | <.02–64,000 |
| Reactive Cyanide | 1.09–30.9 |
| Fluoride | 230–250,000 |
| Reactive Sulfide | <.11–6.24 |
| Aluminum | 47,000–222,000 |
| Antimony | 13–33 |
| Beryllium | 6.2–17 |
| Carbon | 130,000–690,000 |
| Cobalt | 11–16 |
| Copper | 12–110 |
| Magnesium | 100–1,700 |
| Mangenese | 0–200 |
| Nickel | 16–40 |
| Sodium | 86,000–220,000 |
| Thallium | <.5 |
| Tin | 72–120 |
| Vanadium | 75–120 |
| Zinc | .1–63 |
| Alumina | 78,000–260,000 |
| Calcium | 5,000–64,000 |
| Iron Oxide | 3,000–28,000 |
| Phosphorous | 50–300 |
| Silicon Oxide | 7,000–109,000 |
| Sulfur | 0–3,000 |
| Fluorine | 99,000–182,000 |
| Ash % | 57.1–79.5 |

Compositions of typical flyashes are shown in Table 3.

TABLE 3

Composition of Typical Flyashes

| Compound | Boiler Flyash | Auto Shredder Residue Ash | Sewage Sludge Ash | Municipal Solid Waste Incinerator Ash |
| --- | --- | --- | --- | --- |
| $SiO_2$ | 51.80 | 32.6 | 39.51 | 29.5 |
| $K_2O$ | 2.68 | | .54 | 1.57 |
| $Na_2O$ | 0.40 | | .98 | 4.05 |
| $Al_2O_3$ | 25.60 | 9.97 | 9.34 | 11.6 |
| CaO | 1.74 | 6.4 | 14.03 | 28.2 |
| MgO | 0.80 | | 2.52 | 1.8 |
| $Fe_2O_3$ | 10.30 | 23.65 | 8.83 | 2.77 |
| $P_2O_5$ | <0.10 | | 12.58 | |
| $TiO_2$ | 0.20 | | | |
| $Ag_2O$ | | | .0085 | <0.0010 |
| BaO | | | .21 | 0.11 |
| CdO | | | 0.0005 | 0.0065 |
| $Cr_2O_3$ | | 0.06 | 0.5 | 0.09 |
| PbO | | 0.82 | 0.109 | 0.36 |
| MnO | | 0.22 | | |
| ZnO | | 3.07 | | |
| $As_2O_3$ | | | | 0.0034 |
| C | 2.00 | 9.55 | | 6.25 |
| $SO_3$ | 1.50 | 0.36 | .19 | 6.25 |
| F | | | | 0.01 |
| Se | | | 0.0002 | <1 ppm |
| Cl | | | | 6.8 |
| Hg | | | 0.0006 | 0.02 |

The typical composition of electric arc furnace dust is shown below in Table 4.

TABLE 4

Composition of Typical Electric Arc Furnace Dust

| Compound | Electric Arc Furnace Dust (all metals expressed as oxides) |
| --- | --- |
| $SiO_2$ | 3–8% |
| $Al_2O_3$ | 0–2% |
| $Fe_2O_3$ | 45–60% |
| CaO | 4–8% |
| MgO | 1–5% |
| $Na_2O$ | 1–5% |
| $K_2O$ | 1–4% |
| $TiO_2$ | 0–0.5% |
| $P_2O_5$ | 0–1.0% |
| Mn2O3 | 3–9% |
| SrO | 0–1% |
| CuO | 0–1% |
| NiO | 0–0.5% |
| CrO | 0–1% |
| V2O5 | <0.01 |
| ZnO | 10–16% |
| PbO | 0–3% |
| C | 0–5% |
| $So_3$ | <0.01 |
| F | |
| CN | |

The family of glass compositions used in the process of the present invention is such that the glasses are lower in alkali oxides and higher in alkaline earth oxides than typical commercial glasses, such as soda-lime-silicate glass. The use of glasses having this composition decreases the structural stability, from an atomistic perspective, of the glass above the glass transition temperature. This leads to glass crystallization at higher rates in the temperature range from the glass transition temperature to the crystallization temperature of the liquid, thereby producing a tile which does not deform during a fast firing process.

FIG. 1 is a process flow diagram for the process of the present invention. In this process, industrial waste material A, optionally, may be mixed with other additives B. Other additives B may include small amounts of other glass forming ingredients to bring the composition of material A into the desired glass oxide composition range, as shown in Table 1. Other additives B include sand, flyash, titania, zirconia, limestone, dolomite, soda ash, and mixtures thereof. Additionally, different types of industrial waste materials can be combined to give an industrial waste material A having the desired glass oxide composition. Other additives B may include a nucleating-enhancing agent to increase the rate of crystallization by enhancing the nucleation rate of seeds to provide sites for growth. These nucleation enhancing agents include MgO, $TiO_2$, F, $Cr_2O_3$, sulfides, phosphates, and mixtures thereof. In addition, the nucleating agent can be present in industrial waste material A itself.

Industrial material A and any other additives B are blended in blender 2 to produce blended material C.

Blended material C is processed in a melter 4 to form a glass melt D, where glass melt D is a uniform molten liquid. Typically, melting occurs at a melting temperature of from about 1100° to 1550° C. for from 0.25 to 6 hours. During the melting process, industrial waste material A and other additives B decompose and react to form oxides of the metals present in industrial waste material A and other additives B. The metal oxides react and combine to form glass melt D. An oxidizing atmosphere during the glass melting processes operates to oxidize carbon and metals in their metallic state that are potentially present in the selected industrial waste material A. Typically, the melter is a cyclone melter. Bath, pot, open hearth, or electric melters may also be utilized. A particularly preferred form of melter 4 is the Combustion and Melting System manufactured by Vortec Corporation, Collegeville, Pa. Oxidation is carried out in the suspension preheater of the Combustion and Melting System in which blended material C is suspended in an oxidizing fluid. Preferably, the suspension preheater is a counter-rotating vortex suspension preheater. The melting and oxidizing system is described in U.S. Pat. No. 4,957,527 to Hnat, which is hereby incorporated by reference. See also U.S. Pat. No. 4,544,394 to Hnat, which is hereby incorporated by reference.

Figure 2:
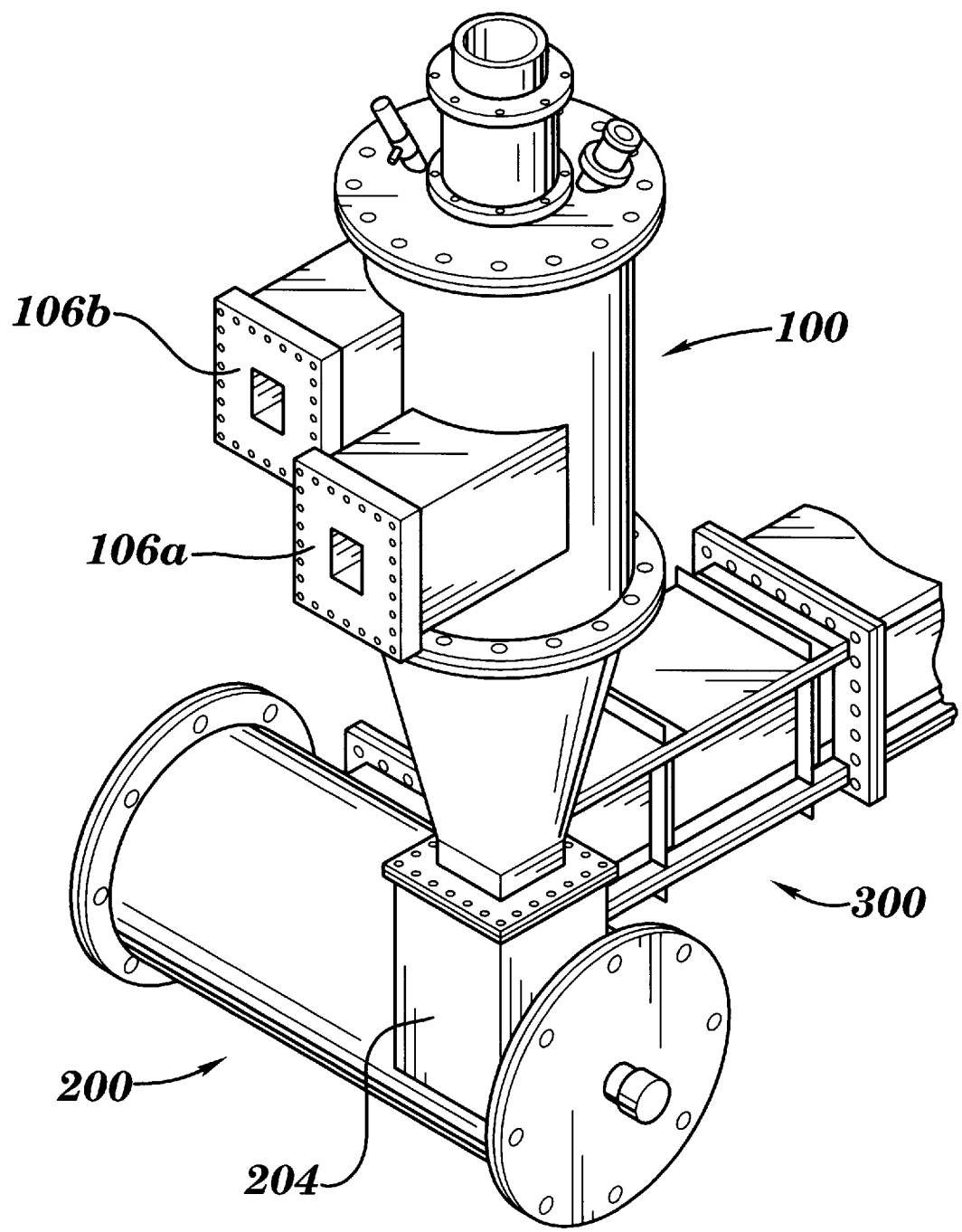
FIG. 2 is a perspective view of an apparatus useful in carrying out the process of the present invention.

FIG. 2 is a perspective view of the Combustion and Melting System useful in practicing the process of the present invention. The primary components of the apparatus of the invention include a suspension-type preheater chamber 100, cyclone melting chamber 200 at the discharge end of the preheater chamber 100, and cyclone exit assembly 300 at the discharge end of melting chamber 200. Other components, such as a gasifier and plasma torch preheater can be incorporated into this system. See U.S. Pat. No. 4,957,527.

Figure 3:
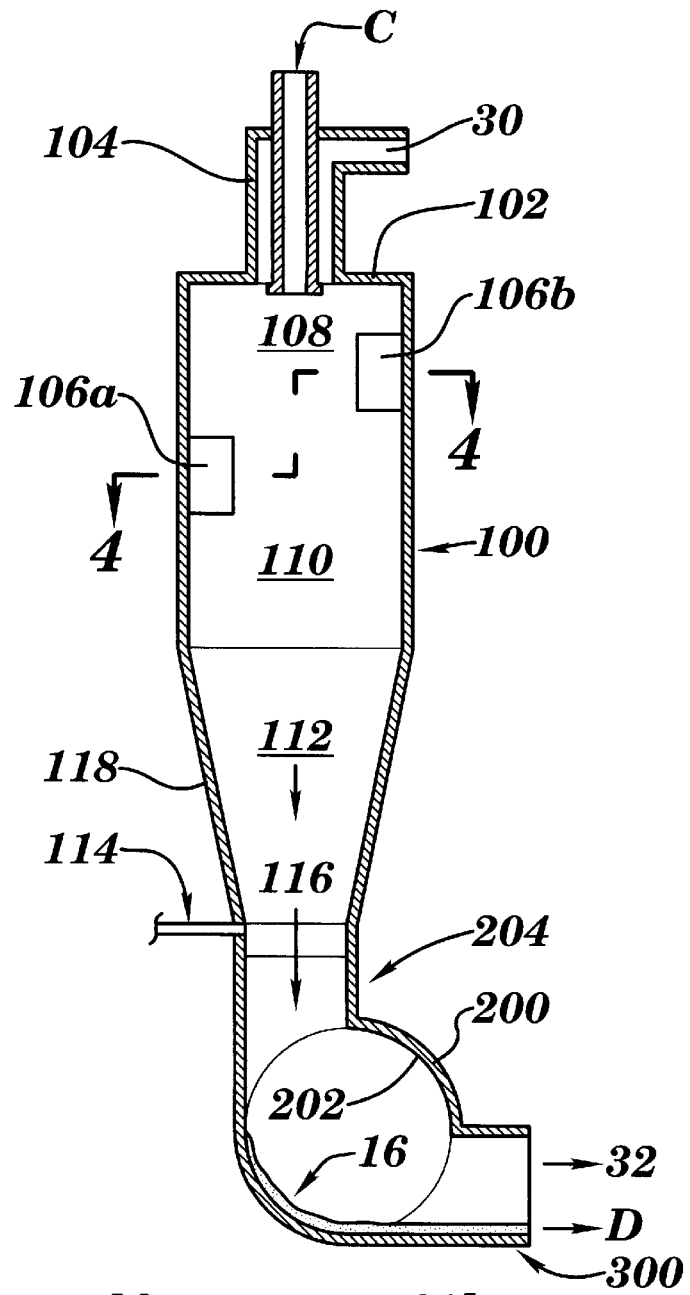
FIG. 3 is a side cross sectional view of the apparatus of FIG. 2.

As shown in FIG. 3, fuel 30 is introduced into top or head end 102 of the preheater 100. Fuel 30 is introduced along with glass batch material 10 through injector assembly 104 which is located at head end 102 of preheater 100 and which is coaxial with the longitudinal axis of the preheater chamber 100.

The preheating step is very important to the invention. The well stirred/plug flow suspension preheater 100 enhances convective heat transfer to particulate matter, while providing combustion stabilization when combustion occurs within the preheater vessel. Due to the intense mixing, rapid heat release in the combustion processes takes place. By selecting the proper injection location and velocity, the interaction of the particulate mineral matter with the walls of the preheater can be either minimized or maximized. Axial injection will tend to minimize interaction with the preheater wall, while tangential injection tends to maximize the interaction with the reactor wall, particularly where high levels of swirl are utilized.

Figure 4:
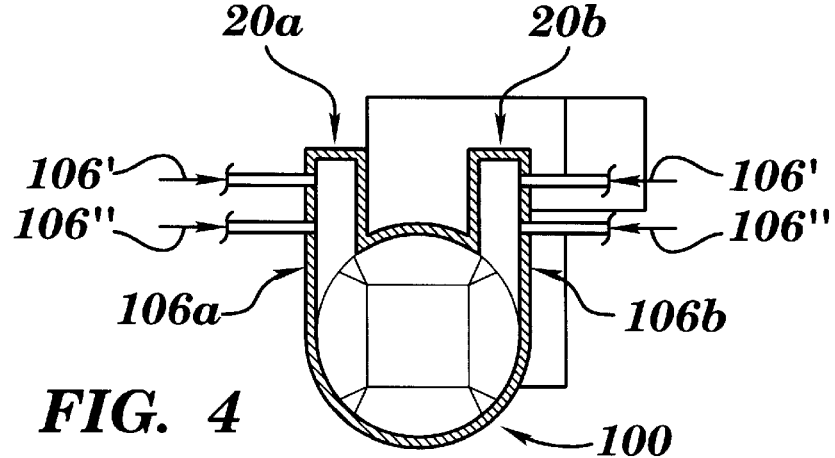
FIG. 4 is a top cross sectional view of the apparatus of FIG. 3 taken along line 4—4.

As shown in FIG. 4, preheated air or other suitable gaseous oxidizing material 20a, 20b is introduced into preheater 100 through two or more inlet ports 106a, 106b. These gaseous oxidizing materials 20a, 20b are introduced in such a manner that they produce turbulent mixing of injected fuel 30 with oxidizing material 20a, 20b and glass batch material 10 (i.e. crusted composition B from FIG. 1). The result is a mixture of fuel, oxidizer, and glass forming materials in upper region 108 of preheater 100. Within upper region 108, the gases present are well stirred or well mixed, but particulate matter (e.g., glass forming materials) in region 108 is not necessarily well stirred or evenly distributed throughout the volume of region 108.

When a counter-rotating preheater is used, as shown in FIGS. 3 and 4, inlet ports 106a, 106b are tangential to the vessel walls and are spaced at different levels. The jets are typically vertically spaced on the order of ¼ to 2 reactor diameters apart.

The combustion of fuel 30 and oxidizing material 20a, 20b within upper region 108 of preheater 100 results in a high intensity heat release and further results in a rapid rate of heat transfer to the particulate matter (e.g. the glass forming materials) suspended in the gas flow within this region. Burning within the preheater occurs via the mixing and stirring of fuel and oxidizer within the well-stirred region of the reactor. Ignition occurs within the preheater with the aid of a pilot burner or conventional electrical ignition assembly. In the preferred embodiment, high temperature air preheat (>500° C.) is provided via a commercially available heat recuperator. In these cases, radiation from the preferred refractory lined reactor walls will generally establish auto ignition of the various fuel and oxidizer mixtures to be used. Strong recirculation in upper region 108 of preheater 100 is created by counter-rotating vortices or impinging jets, thus providing the primary means of flame stabilization within the preheater. Without this strong recirculation of the combustion gases, flame extinguishment tends to occur due to the quenching of the flame by inert batch materials or other mineral matter within the preheater assembly. This is particularly true of mineral matter, such as limestone, which liberates substantial amounts of $CO_2$ upon heating. When low heating value fuels are used, auxiliary gas injection, separate igniters, or pilot burners can also be used to achieve flame stabilization within the preheater.

When preheater 100 is a cylindrical-type combustion chamber, primary flame and heat release occurs in upper region 108 which occupies a chamber volume with a length to diameter ratio of approximately 0.5:1–3.0:1, preferably 1:1. The strong mixing of the fuel and oxidizer within this region permits the effective combustion of many types of fuels, including gaseous, liquid, solid or liquid-solid slurry type fuels.

Downstream of upper region 108 within the preheater 100 is lower or plug flow region 110 where a plug flow of gas and solid or liquid particles is produced and where final combustion of fuel 30 is completed. By plug flow, it is meant that gas recirculation patterns have abated and the primary direction of flow is parallel to the longitudinal axis of the reactor. The effective length-to-diameter ratio of plug flow region 110 is, again, approximately 0.5:1–3.0:1, preferably, 1:1. The gaseous materials, fuel 30, oxidizers 20a, 20b, and entrained blended materials C within plug flow region 110 are accelerated through converging section 112 of preheater chamber 100. From converging section 112, the gas and entrained batch materials are delivered into cyclone-type melting chamber 200 where secondary combustion occurs at an average temperature which exceeds the melting point of the glass product, and where separation, dispersion, mixing, and melting of the preheated batch materials occurs along walls 202.

It is the intention of the present invention to heat the blended materials C in suspension and to minimize liquid glass formation along the walls of preheater 100. However, when low melting point species are included as part of the mixture, some liquid glass species formation will occur along the walls of the preheater by vapor phase condensation or by turbulent deposition.

Glass melt D formed on walls 202 of cyclone melting chamber 200 and hot gases 32 from cyclone chamber exit cyclone melting chamber 200 through exhaust duct assembly 300 which is preferably positioned tangential to the walls of the cyclone melting chamber. An exit channel along the longitudinal axis of the cyclone melter is also possible. It is also desireable to separate the exhaust products from melt D in a gas separation and interface assembly. In this arrangement, glass melt D and hot gases 32 exit the cyclone melting chamber 200 through a tangential exit channel into a reservoir (not shown). Hot gases 32 exit the reservoir through an exhaust port located in the reservoir roof. The reservoir also provides sufficient amounts of melted glass product 16 for interfacing with the downstream tile forming equipment.

After the melting step, glass melt D either (1) is poured into water to create a solid glass product such as glass frit E or (2) cooled in a controlled manner to produce a solid glass product, such as cooled product F.

In the first option, in a quenching step 6, glass melt D is poured into water at a temperature of from about 40° to 95° C. for from 0.5 to 10 minutes to quench glass melt D. The quenching process freezes in the glass structure and mechanically stresses the material due to the large thermal gradients induced, which leads to glass melt D cooling and fracturing into glass frit E with a particle size typically smaller than 5 mm. The resulting glass frit E is then dried by any suitable method.

The glass frit E from the quenching step can be handled using two alternate embodiments. In the first embodiment, glass frit E is devitrified in devitrification step 10 to form a granular crystallized product G. After the devitrification step 10, granular crystalline material G is introduced into the tile making process. In the second embodiment, glass frit E is directly introduced into the tile making process, without a devitrification step.

The first embodiment devitrifies glass frit E in a devitrification step 10 to convert glass frit E into crystalline material G. Devitrification step 10 is typically carried out in a reservoir, a furnace, or an oven. The devitrification of glass frit E is performed by heat treating the material with a specific heat treatment cycle. The exact heat treatment cycle is dependent on the composition of the glass to be devitrified and would be apparent to one skilled in the art. Preferably, during the heat treatment cycle, glass frit E is heated from below its glass transition temperature to a temperature of from about 800° to 1200° C. More preferably, devitrification step 10 includes heating the glass frit at a rate of from 200° to 1000° C. per hour to 800° to 1200° C., holding the glass frit at a constant temperature for from 0 to 2 hours, and then cooling the frit at a rate of from 200° to 2000° C. per hour to room temperature. Most preferably, during the heat treatment, glass frit E is held at a temperature less than 100° C. above its glass transition temperature to enhance the formation of crystal nuclei in the bulk of the material of glass frit E. Then, as the temperature is increased to the maximum, the rate of nucleation decreases and the rate of crystal growth increases. The nuclei that have formed, grow and consume the remainder of the glass. During devitrification step 10, a primary crystalline phase is produced where the primary crystalline phase consists of nepheline, diopside, anorthite, wollastonite, melilite, merwinite, spinel, akermanite, gehlenite, crystalline phases based on iron substitutions in the crystalline phase and mixtures thereof. For purposes of this application, the term "primary crystalline phase" is defined as the crystalline phase constituting at least 50 wt. % of the crystalline material in the product resulting from devitrification step 10.

In the second embodiment, glass frit E is introduced into the tile making process without any further processing. The heat treatment to form a devitrified material occurs during the firing of the tile bodies, (discussed below).

In an alternative step, glass melt D is cooled in a controlled manner. Cooling of glass melt D in a cooling step 8 under a controlled temperature profile will lead to a devitrified product F at room temperature. Typically, the cooling step 8 takes place in a reservoir. Preferably, cooling step 8 includes lowering the temperature of glass melt D at a rate of from 200° to 1000° C. per hour to produce devitrified product F. This devitrified product F can then be introduced directly into the grinding step of the tile making process. The product F resulting from the controlled cooling is similar to the crystalline material obtained by devitrification step 10 described above.

It is desirable to introduce additional nucleation sites into the glass by grinding products E, F, or G into a powder with a particle size less than 200 microns, and preferably less than 50 microns. This greatly increases the rate of devitrification of the glass. Thus, the glass frit E, devitrified product F, or crystalline material G may be ground in grinding step 12 to produce glass particles H.

The glass particles are then processed in a typical tile making procedure.

Glass particles H are mixed with an additive I to form a glass powder mixture J having a composition of 55–99 wt. % glass particles and 1–45 wt. % additive I. Additive I may be any additive typically common to the tile industry such as clays, silica, dolomite, limestone, inorganic or organic binders, and fluxes. Additive I typically comprises a binder which increases the green strength of the tile body after pressing and controls the properties of the final ceramic body. The binders used in the process may be organic or inorganic. The inorganic binders typically consist of fine clay materials such as bentonite and ball clay. When using organic binders, typical additions of 1 to 5 weight percent binder to the glass particles are required. For making tiles using the clay binders, 70 to 90 wt. % of the tile body can be glass particles H, with the remaining 10 to 30 wt. % comprising clay. Additive I can also include fluxes to decrease the firing temperature of the tiles. Additionally, the composition of additive I can be adjusted to obtain the desired properties (such as porosity, water absorption, and thermal expansion) for the final product. This allows for a desired tile type (e.g., pavers, wall tile, and roofing tile) to be obtained.

In a ball milling step 14, glass powder mixture J is mixed in a ball mill with water to further reduce the particle size of the ingredients and to uniformly mix the batch. Slurry K generated by the ball mill is then spray dried in a conventional spray drying step 16 to form a free flowing granular feed L for the tile presses. In pressing step 18, hydraulic tile presses shape free flowing granular feed L at from 100 to 600 kg/cm² into shaped tiles M. After pressing step 18, shaped tiles M are dried in drying step 20 by a traditional tile drying process. The resulting unglazed tiles N can be glazed, in a glazing step 22 to produce a glazed tile O. Glazing step 22 is a traditional tile glazing step well known to those skilled in the art. Glazed tile O is fired in a traditional tile firing step 24 at from 800° to 1250° C. for from 0.3 to 2 hours to yield a final product P. Preferably, cycle time is less than 1 hour. Alternatively, unglazed tiles N can be subjected to firing step 24 without glazing to yield final product P which can be glazed and refired subsequently.

During firing step 24, glass frit E and crystalline material G and product F behave in different manners. Where the products are produced by the method in which devitrification occurs prior to forming of tiles (i.e., product F and crystalline material G), these ceramic material do not soften significantly during firing step 24, because of the high melting temperature of the crystalline materials. The bonding of the particles in the tile bodies primarily occurs due to the clays and additive I reacting and forming a small amount of a liquid phase which bonds the ceramic particles together. Secondarily, a minor amount of sintering between the ceramic particles may occur to aid in bonding the particles together.

In the case where the glass was mixed into the tile body without prior devitrification (i.e. from glass frit E), devitrification of the glass occurs during firing step 24. The glass initially softens during the firing process at temperatures slightly above the glass transition temperature (500°–750° C. dependent on the glass composition) to a very viscous liquid (viscosity $10^{14}$–$10^{16}$ poise). When the tile body is heated to a greater extent, the glass softens (i.e., the viscosity decreases) and begins to flow. Additionally, crystal nuclei form and crystal growth occurs leading to the crystallization of the glass melt. The crystallization consumes a majority glass melt. Crystal growth can also nucleate on the surface of the glass particles (i.e., surface crystallization). Surface crystallization leads to the bulk of the glass material devitrifying at a high rate due to the high surface to volume ratio of the glass powders. The crystalline phase is strongly dependent on the glass composition. The melting temperature of the crystalline phases are typically above the processing temperature of the ceramic tiles (i.e., >1150° C.). Thus, during firing step 24, a tile is produced having a primary crystalline phase, where the primary crystalline phase consists of nepheline, diopside, anorthite, wollastonite, melilite, merwinite, spinel, akermanite, gehlenite, crystalline phases based on iron substitutions in the crystalline phase and mixtures thereof.

The method of the present invention produces a ceramic tile having a composition of 35–60 wt. % $SiO_2$, 3–25 wt. % $Al_2O_3$, 0–25 wt. % CaO, 0–20 wt. % MgO, 0.5–15 wt. % $Fe_2O_3$, 0–15 wt. % $Na_2O$, 0 to 5 wt. % $K_2O$, 15 to 30 wt. % CaO+Mgo, 0 to 15 wt. % $Na_2O$+$K_2O$, and 0–5 wt. % other oxides. The other oxides include oxides of copper, manganese, chromium, nickel, zinc, arsenic, lead, gold, silver, sulfur, and mixtures thereof. Further, the ceramic tile has a primary crystalline phase, where the primary crystalline phase consists of nepheline, diopside, anorthite, wollastonite, melilite, merwinite, spinel, akermanite, gehlenite, crystalline phases based on iron substitutions in the crystalline phase and mixtures thereof.

EXAMPLES

Example 1

Glass frits prepared from coal fired utility boiler flyash were processed into a glass that is suitable for producing floor tile bodies. The glass was devitrified prior to being ground into particles and mixed with additives into a powder for tile pressing. Tiles were pressed and fired from this material using a standard industrial tile press and roller hearth kiln. The tile bodies produced had processing behavior and final properties desirable to the commercial tile industry.

The composition of the coal fired utility boiler flyash is given Table 5:

TABLE 5

| Oxide | Weight % |
| --- | --- |
| $SiO_2$ | 51.8 |
| $Al_2O_3$ | 25.6 |
| MgO | 0.80 |
| CaO | 1.74 |
| $Na_2O$ | 0.40 |
| $K_2O$ | 2.68 |
| $Fe_2O_3$ | 10.3 |
| C | 6.18 |

Based on this analysis, the flyash required the addition of a flux to decrease the melting temperature to below 1500° C. The flyash was mixed with 20 wt. % limestone to decrease the melt temperature. The glass was then melted in a cyclone glass melter at a temperature of approximately 1450° C. This type of melter allowed for the efficient oxidation of the unburned carbon in the flyash. The glass produced from the melter was poured into water to produce a frit with a particle size less than 1 cm. The resulting composition of the glass produced from this melting procedure as determined by chemical analysis is given in the Table 6:

TABLE 6

| Oxide | Weight % |
| --- | --- |
| $SiO_2$ | 44.37 |
| $Al_2O_3$ | 21.89 |
| MgO | 0.81 |
| CaO | 20.59 |
| $Na_2O$ | 0.34 |
| $K_2O$ | 2.29 |
| $Fe_2O_3$ | 8.8 |

Figure 5:
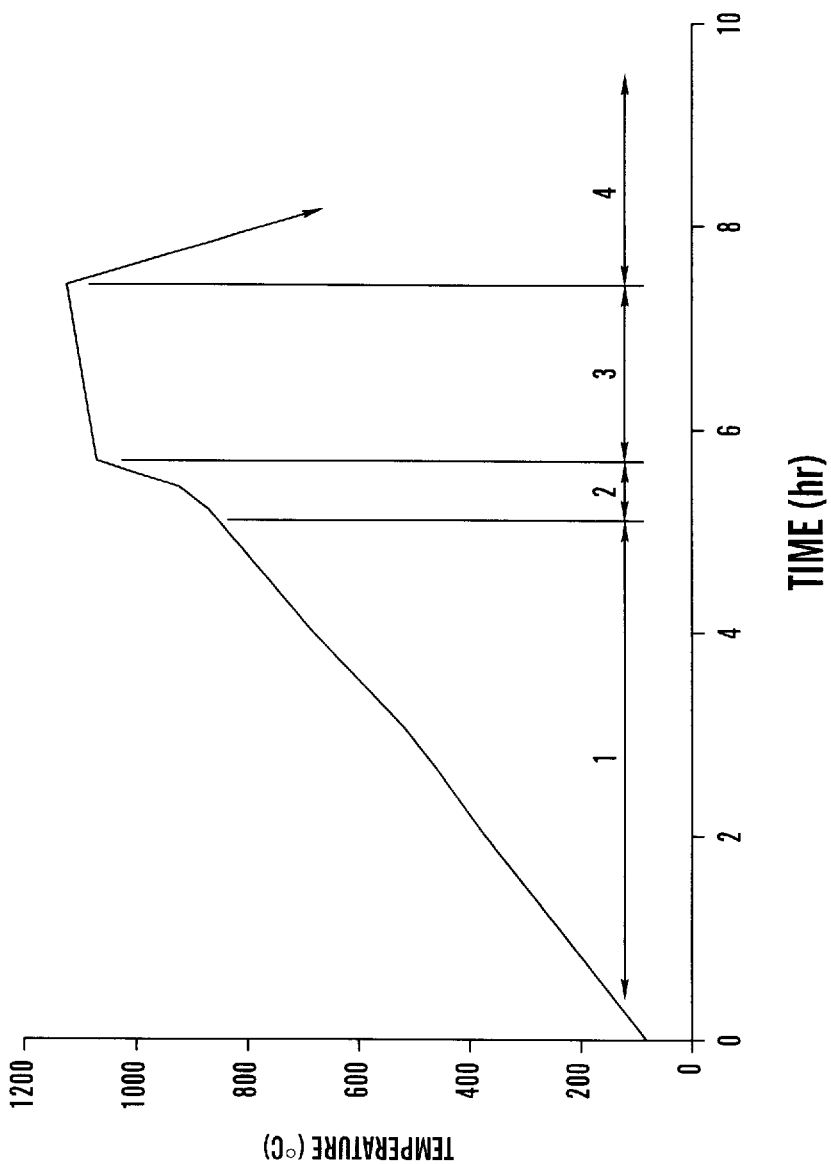
FIG. 5 is a temperature profile used for devitrification in the process of the present invention glass.

After drying, the glass frit was devitrified to convert the material from a glass to a crystalline product. The devitrification process was performed in an electric box furnace in 60 to 120 pound batches. The material was spread on the furnace floor to a depth of approximately 4 inches. The glass frit was then heated to approximately 1100° C. in 4.5 hr. The temperature profile of the heat treatment is given in FIG. 5. In region 1 of FIG. 5, the glass was heated at a constant rate. The increase in the heating rate of the material in Region 2 of FIG. 5 was related to the heat released from the glass as crystallization occurs. The material was then held at a constant temperature for approximately 1.5 hours, as shown in Region 3 of FIG. 5. The resulting devitrified material was then allowed to cool slowly to room temperature over several hours as shown in Region 4 of FIG. 5. The heat treatment process resulted in the color of the glass frit changing from black to brown due to the change in the atomic structure of the material.

The resulting crystalline material was ground with a hammer mill to obtain a powder with a particle size of approximately 5 mm. Additives were added such that the batch prepared consisted of 91 wt. % crystallized frit, 6 wt. % borosilicate glass frit, 2 wt. % bentonite, and 1 wt. % organic binder. The borosilicate glass frit provided a liquid phase to bond the ceramic particles together during the firing process while the bentonite and organic binder increased the green strength of the tiles before firing. A wet ball mill reduced the particle size of the crystallized cullet and blended the batch ingredients. The resulting slurry was spray dried to remove the water from the system and to form free flowing agglomerates from the fine particles. The spray dried powder was a suitable feedstock to the tile presses.

The resulting spray dried powder was pressed into 30×30 cm tiles with a pressure of 320 kg/cm$^2$. The resulting green tiles were dried to remove any remaining water, glazed, and fired. The tiles were fired at a temperature of 1170° C. in a 36 minute firing cycle (cold to cold).

The resulting tiles produced in this example were suitable for the application as floor tiles and pavers. The following properties were determined for the tiles prepared:

| Density | 1.75 kg/cm$^2$ |
| --- | --- |
| Black core | none |
| Firing shrinkage | 7% |
| Water absorption | 1.5% |
| Modulus of rupture | 500 kg/cm$^2$ |

Example 2

Glasses prepared from municipal solid waste incinerator ("MSW") ashes were processed into a glass that is suitable for producing tile bodies. The glass used in this example was not devitrified before forming the tile. The tiles were pressed and fired using standard tile industry equipment. The tile bodies produced had processing behavior and final properties desirable to the commercial tile industry.

The composition of the MSW ash used in the vitrification process is given in Table 7:

TABLE 7

| Oxide | Weight % |
| --- | --- |
| SiO$_2$ | 35.0 |
| Al$_2$O$_3$ | 9.68 |
| MgO | 5.25 |
| CaO | 18.8 |
| Na$_2$O | 3.67 |
| K$_2$O | 1.55 |
| Fe$_2$O$_3$ | 6.41 |

To prepare a glass from this composition no glass forming additives were required. The MSW ash was melted in a cyclone type glass melter. The oxidizing atmosphere of this type of melter prevented selected heavy metals such as lead from reducing from their metallic state. The glass was processed at a temperature of 1275° C. The resulting glass melt was poured into water to prepare a glass frit. The composition of the glass frit is given in Table 8:

TABLE 8

| Oxide | Weight % |
| --- | --- |
| SiO$_2$ | 42.2 |
| Al$_2$O$_3$ | 12.5 |
| MgO | 6.29 |
| CaO | 22.5 |
| Na$_2$O | 2.88 |
| K$_2$O | 0.73 |
| Fe$_2$O$_3$ | 7.60 |

The glass frit, without devitrification, was reduced to <5.0 mm particle size with a hammer mill. Additives were added such that the composition of the tile batch was 66 wt. % glass frit, 28 wt. % ball clay, and 6 wt. % quartz. The batch materials were wet ball milled to reduce the size of the glass particles and to blend the batch materials. The resulting material was dried and crushed to break up the large agglomerates. The resulting powder was then added to 5 wt. % water and passed through a screen with 0.7 mm openings to yield a granular material for tile pressing.

The tile batch was pressed into tiles with the dimensions of 16×8 cm with approximately 300 kg/cm$^2$ of pressure. The resulting tiles were dried and fired in a 45 minute firing cycle (cold to cold). Different samples were fired at 1040°, 1080°, and 1120° C. to determine the effects of firing temperature.

The properties of the tiles fired at 1080° C. were as follows:

| Black core | none |
| --- | --- |
| Firing shrinkage | 4.40% |
| Water absorption | 2.53% |
| Modulus of rupture | 752 kg/cm$^2$ |

The properties of the tiles fired at 1040° and 1120° C. were essentially the same. This indicates that the dimensions and properties of the final product will be relatively independent to changes in the firing temperature.

Example 3

Glass prepared from spent potliners from aluminum reduction were processed to prepare dense ceramic bodies. The glass used in this example was not devitrified before forming the tile. The samples were prepared on a laboratory scale. The glass in the pressed bodies appeared to devitrify completely without the body deforming during the firing process. The ceramic bodies produced have desirable properties for application in the tile industry.

Spent potliners ("SPL") from aluminum reduction consist of a combination of graphite block and insulating refractory brick. The insulating brick is primarily composed of SiO$_2$, Al$_2$O$_3$, and CaO. In addition to carbon, the graphite blocks contain residual cryolite (Na$_3$AlF$_6$), cyanides, and aluminate metal. A typical oxide composition of the combined graphite block and insulating refractory brick is given in the Table 9:

TABLE 9

| Oxide | Weight % |
| --- | --- |
| SiO$_2$ | 16.5 |
| Al$_2$O$_3$ | 22.8 |
| CaO | 2.57 |
| Na$_2$O | 23.8 |
| Fe$_2$O$_3$ | 2.02 |

TABLE 9-continued

| Oxide | Weight % |
|---|---|
| $SO_3$ | 0.27 |
| F | 13.2 |
| C | 23.8 |

The SPL material was mixed with additional glass forming oxides in amounts suitable to produce a glass batch for the devitrification process which contained 60.0 weight percent SPL, 15.0 weight percent limestone, 12.5 weight percent sand, and 12.5 weight percent container glass cullet. The glass was then melted in a cyclone glass melter at approximately 1300° C. A cyclone melter allowed for the efficient oxidation of the carbon from the graphite block. The glass produced from the melter was poured into water to produce a frit with a particle size less than 1 cm. The resulting composition of the glass produced from this melting procedure as determined by chemical analysis is given in Table 10:

TABLE 10

| Oxide | Weight % |
|---|---|
| $SiO_2$ | 45.0 |
| $Al_2O_3$ | 22.7 |
| CaO | 12.5 |
| $Na_2O$ | 13.1 |
| $Fe_2O_3$ | 1.47 |
| $SO_3$ | 0.022 |
| F | 1.13 |
| C | 0.004 |

A hammer mill was used to reduce the size of the glass frit to less than 0.5 mm. The glass frit particle was reduced further, to less than 50 μm, by wet ball milling. Two batches were mixed with the compositions of 80 weight percent glass frit and 20 weight percent kaolin, and of 70 weight percent glass frit and 30 weight percent kaolin. The powder was mixed with 2 weight percent water and pressed into disks with a circular die and a laboratory press. The diameter of the disks were 5.7 cm. The pressure used for the pressing was 70 kg/cm². The disks were fired in a box furnace to 1100° C. The time required to reach the maximum temperature was 2 hr. The temperature was held at the maximum temperature for 20 minutes. The disks were cooled to room temperature over a period of approximately 3 hours.

Both disk compositions resulted in ceramic bodies that had the appearance of traditional fired clay bodies. The properties for the disks for the two compositions are:

| Property | 20 weight % kaolin | 30 weight % kaolin |
|---|---|---|
| Density | 2.12 | 2.16 |
| Black core | none | none |
| Firing shrinkage | 6.62% | 6.73 |
| Water absorption | 13.25% | 6.92% |

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A process of forming ceramic tiles having the appearance of tiles produced from clays comprising: melting a material which includes waste materials to form a glass melt; treating the glass melt to produce a solid glass product; grinding the solid glass product to produce glass particles having a particle size of less than 200 microns; mixing the glass particles with a first additive comprising a binder selected from the group consisting of clay, organic material, inorganic material and mixtures thereof, to form a glass powder mixture having a composition of 55–99 wt. % glass particles and 45–1 wt. % first additive; forming the glass powder mixture into tiles by dry pressing; and devitrifying the glass particles in the tile after said forming step under conditions effective to form tiles having a primary crystalline phase selected from the group consisting of nepheline, diopside, anorthite, wollastonite, melilite, merwinite, spinel, akermanite, gehlenite, crystalline phases based on iron substitutions in the crystalline phase, and mixtures thereof.

2. A process according to claim 1, wherein the material used to form the glass melt contains 35–60 wt. % $SiO_2$, 3–25 wt. % $Al_2O_3$, 0–25 wt. % CaO, 0–20 wt. % MgO, 0.5–15 wt. % $Fe_2O_3$, 0–15 wt. % $Na_2O$, 0 to 5 wt. % $K_2O$, 15 to 30 wt. % CaO+MgO, 0 to 15 wt. % $Na_2O+K_2O$, and 0 to 5 wt. % other oxides.

3. A process according to claim 2, wherein the other oxides are selected from the group consisting of oxides of copper, manganese, chromium, nickel, zinc, arsenic, lead, gold, silver, sulfur, and mixtures thereof.

4. A process according to claim 1, further comprising:
adding a nucleation enhancing agent to the material used to form the glass melt to increase the rate of said devitrifying.

5. A process according to claim 4, wherein the nucleation enhancing agent is selected from the group consisting of MgO, $TiO_2$, F, $Cr_2O_3$, sulfides, phosphates, and mixtures thereof.

6. A process according to claim 1 further comprising:
mixing the material used to form the glass melt with a second additive selected from the group consisting of sand, flyash, dolomite, soda ash, limestone, titania, zirconia, and mixtures thereof prior to said melting step to form a mixture.

7. A process according to claim 1, wherein said treating comprises:
quenching the glass melt to produce a glass frit.

8. A process according to claim 1, wherein said devitrifying step comprises:
heat treating the tile under conditions effective to achieve nucleation.

9. A process according to claim 8, wherein said heat treating comprises firing the tile at a temperature of from 800° to 1250° C.

10. A process according to claim 9, wherein said heat treating has a cycle time of less than 2 hours.

11. A process according to claim 1, wherein the first additive comprises 1 to 20 wt % of the mixture.

12. A process according to claim 3 further comprising oxidizing the material used to form the glass melt under conditions effective to oxidize metals and carbonaceous material present in the material.

13. A process according to claim 12, wherein said oxidizing is carried out in a suspension preheater in which the glass is suspended in an oxidizing fluid.

14. A process according to claim 12, wherein said suspension preheater is a counter-rotating vortex suspension preheater.

15. A process according to claim 1 further comprising:

blending the glass particles and the first additive with water to form a slurry and spray drying the slurry to produce a granular feed prior to said forming step.

16. A process according to claim 1 further comprising:

glazing the tile.

17. A process of forming ceramic tiles having the appearance of tiles produced from clays comprising: melting a material which includes waste materials to form a glass melt; treating the glass melt to produce a solid glass product; devitrifying the solid glass product to produce a devitrified product with a primary crystalline phase selected from the group consisting of nepheline, diopside, anorthite, wollastonite, melilite, merwinite, spinel, akermanite, gehlenite, crystalline phases based on iron substitutions in the crystalline phase, and mixtures thereof; grinding the devitrified product to produce devitrified particles having a particle size of less than 200 microns; mixing the devitrified particles with a first additive comprising a binder selected from the group consisting of clay, organic material, inorganic material and mixtures thereof, to form a devitrified powder mixture having a composition of 55–99 wt. % devitrified particles and 45–1 wt. % first additive; forming the devitrified powder mixture into tiles by dry pressing; and heat treating the tiles under conditions effective to form fired ceramic tiles.

18. A process according to claim 17, wherein the material used to form the glass melt contains 35–60 wt. % $SiO_2$, 3–25 wt. % $Al_2O_3$, 0–25 wt. % CaO, 0–20 wt. % MgO, 0.5–15 wt. % $Fe_2O_3$, 0–15 wt. % $Na_2O$, 0 to 5 wt. % $K_2O$, 15 to 30 wt. % CaO+MgO, 0 to 15 wt. % $Na_2O+K_2O$, and 0 to 5 wt. % other oxides.

19. A process according to claim 18, wherein the other oxides are selected from the group consisting of oxides of copper, manganese, chromium, nickel, zinc, arsenic, lead, gold, silver, sulfur, and mixtures thereof.

20. A process according to claim 17, further comprising:

adding a nucleation enhancing agent to the material used to form the glass melt to increase the rate of said devitrifying.

21. A process according to claim 20, wherein the nucleation enhancing agent is selected from the group consisting of MgO, $TiO_2$, F, $Cr_2O_3$, sulfides, phosphates, and mixtures thereof.

22. A process according to claim 17 further comprising:

mixing the material used to form the glass melt with a second additive selected from the group consisting of sand, flyash, dolomite, soda ash, limestone, titania, zirconia, and mixtures thereof prior to said melting step to form a mixture.

23. A process according to claim 17, wherein said treating comprises:

quenching the glass melt to produce a glass frit.

24. A process according to claim 23, wherein said devitrifying is carried out in a reservoir or a furnace.

25. A process according to claim 23, wherein said devitrifying comprises:

holding the glass frit at a temperature less than 100° C. above the glass transition temperature.

26. A process according to claim 23, wherein said devitrifying comprises:

heating the glass frit at a rate of from 200° to 1000° C. per hour to 800° to 1200° C.;

holding the glass frit at a constant temperature for from 0 to 2 hours; and cooling the glass frit at a rate of from 200° to 2000° C. per hour to room temperature.

27. A process according to claim 23, wherein said devitrifying is carried out at a temperature of from 800° to 1200° C.

28. A process according to claim 17, wherein said devitrifying step comprises:

cooling the glass melt.

29. A process according to claim 28, wherein said cooling step comprises lowering the temperature of the glass melt at a rate of from 200° to 1000° C. per hour.

30. A process according to claim 17, wherein the first additive comprises 1 to 20 wt % of the mixture.

31. A process according to claim 19 further comprising:

oxidizing the material used to form the glass melt under conditions effective to oxidize metals and carbonaceous material present in the material.

32. A process according to claim 31, wherein said oxidizing is carried out in a suspension preheater in which the glass is suspended in an oxidizing fluid.

33. A process according to claim 31, wherein said suspension preheater is a counter-rotating vortex suspension preheater.

34. A process according to claim 17 further comprising:

blending the glass particles and the first additive with water to form a slurry and spray drying the slurry to produce a granular feed prior to said forming step.

35. A process according to claim 17 further comprising:

glazing the tile.

* * * * *